(12) United States Patent
Zimmer

(10) Patent No.: US 9,758,106 B2
(45) Date of Patent: Sep. 12, 2017

(54) KAYAK LOADING DEVICE

(71) Applicant: Fred E. Zimmer, Port Ewen, NY (US)

(72) Inventor: Fred E. Zimmer, Port Ewen, NY (US)

( * ) Notice: Subject to any disclaimer, the term of this patent is extended or adjusted under 35 U.S.C. 154(b) by 82 days.

(21) Appl. No.: 14/952,750

(22) Filed: Nov. 25, 2015

(65) Prior Publication Data

US 2017/0144608 A1    May 25, 2017

(51) Int. Cl.
*B60R 9/042* (2006.01)
*B60R 9/10* (2006.01)
*B60R 9/08* (2006.01)

(52) U.S. Cl.
CPC .............. *B60R 9/042* (2013.01); *B60R 9/08* (2013.01)

(58) Field of Classification Search
CPC ......... B66C 23/44; B66C 23/36; B66C 23/42; B66C 2700/062; B60P 3/1016; B60P 3/1025; B60R 9/042; Y10S 224/924
USPC ..... 212/180, 299, 306; 414/10, 11, 462, 546
See application file for complete search history.

(56) References Cited

U.S. PATENT DOCUMENTS

| | | | | |
|---|---|---|---|---|
| 1,739,938 A * | 12/1929 | Barnett | .............. | B66C 23/44 212/180 |
| 2,145,378 A * | 1/1939 | Trippensee | .............. | B60P 3/125 212/299 |
| 2,283,443 A * | 5/1942 | Klein | .............. | B66C 23/36 212/264 |
| 2,740,535 A * | 4/1956 | Bill | .............. | B66C 13/18 212/264 |
| 2,951,601 A * | 9/1960 | Castoe | .............. | B60P 1/5428 212/264 |
| 2,967,635 A * | 1/1961 | Barnett | .............. | B60P 3/1016 414/462 |
| 3,794,192 A * | 2/1974 | Monson | .............. | B60P 1/5428 212/300 |
| 3,912,088 A * | 10/1975 | Bronfman | .............. | B66C 23/72 212/260 |
| 3,927,779 A * | 12/1975 | Johnson | .............. | B60P 3/1025 414/462 |
| 4,049,238 A * | 9/1977 | Brown | .............. | B66C 23/42 212/264 |
| 4,269,396 A * | 5/1981 | Easterwood | .............. | B66C 23/44 212/177 |
| 5,480,041 A * | 1/1996 | Turner | .............. | B66C 23/36 212/273 |
| 5,957,350 A | 9/1999 | Giles | | |
| 6,612,549 B1 * | 9/2003 | Woods, Jr. | .............. | B66C 23/44 254/323 |
| 6,634,529 B2 * | 10/2003 | Choiniere | .............. | B60R 9/042 224/310 |
| 7,575,120 B2 * | 8/2009 | Beatty | .............. | B66C 23/44 212/180 |
| 8,167,180 B2 | 5/2012 | Bogoslofski et al. | | |
| 8,733,604 B2 | 5/2014 | Murray et al. | | |
| 9,067,522 B2 | 6/2015 | Laverack et al. | | |
| 2006/0273122 A1 | 12/2006 | Bogoslofski et al. | | |
| 2008/0035689 A1 | 2/2008 | Murray et al. | | |

(Continued)

*Primary Examiner* — Gregory Adams
(74) *Attorney, Agent, or Firm* — Lawrence D. Cutter, Esq.

(57) ABSTRACT

A device for loading a kayak onto a vehicle comprises four connected supporting arms. The first and third arms are connected at substantially right angles. A second arm is connected via a fourth arm to the third arm. The connections are made at right angles through T-shaped connectors which provide rotatably and slidability.

5 Claims, 9 Drawing Sheets

(56) References Cited

U.S. PATENT DOCUMENTS

2014/0252056 A1 9/2014 Murray et al.
2014/0263503 A1 9/2014 Laverack et al.

* cited by examiner

KAYAK LOADING DEVICE

TECHNICAL FIELD

The present invention is generally directed to a device for loading a kayak or similar object onto a vehicle. More particularly, the present invention is directed to a device which is employed in conjunction with well-known car roof-mount systems. The present invention is used with such systems to raise a kayak from ground level to a height consistent with its placement on/in the roof mount. The present invention may also be employed with roof rack systems comprising two bars/rods extending from one side window of a vehicle to another.

BACKGROUND OF THE INVENTION

The present invention is designed for use by kayakers and the users of small boats having weights and structures similar to those of a kayak. While kayaks are generally considered to be relatively lightweight in comparison to other boats, nonetheless they are typically transported by means of roof racks on a vehicle. There are several brands of roof rack that are typically employed in the transport of kayaks, these include the following two widely used brands: Thule® and Yakima®. The roof racks provided by these manufacturers and by others for the purpose of transporting various objects typically include at least two support structures that extend from one side window of the vehicle to the opposite side window. These two support structures are typically disposed in a parallel relation so as to support a kayak on the roof of the vehicle. Naturally, the kayak is oriented so that its prow is pointing to the front of the vehicle and its stern is pointing to the rear of the vehicle. Clearly, this orientation may also be reversed.

Manufacturers supply basic roof racks and additional attachments for loading various objects on a vehicle. For example, the basic roof rack structure may include an attachment for holding one or more bicycles on the roof of the vehicle. Similarly, the basic roof rack structure may also include an extra cargo pod for holding suitcases, sporting equipment, and the like for long trips. Most relevantly for the present invention, however, the two cited manufacturers, and others, also supply attachable cradles for holding kayaks. In general, kayaks are affixed to vehicles in one of two positions: (1) flat or down; and (2) at an angle in a cradle. This latter positioning is particularly advantageous when it is desired to carry a number of kayaks on the same vehicle at the same time. It is this last cradling arrangement which is taken advantage of in a preferred embodiment of the present invention. It is noted, however, that the present invention is also employable using a basic roof rack structure not having additional cradles for a boat.

Cradling structures for holding kayaks on a roof rack are illustrated in US patent application number US 2014/0263503 published on Sep. 18, 2014 in the name of Laverack et al.

It is also known that it is possible to employ rods extending from the ends of the roof rack to the ground in a sloped configuration. Such a device is illustrated in FIG. 4, discussed more fully below, and may be used in conjunction with the present invention but is not part of the present invention.

Individuals who are older, disabled, suffer from muscle or joint weakness or who are afflicted with various illnesses may not always be in a condition to lift a kayak to the full height of a vehicle roof. This is particularly true if the vehicle is a van rather than a sedan. Such individuals may require, perhaps only from time to time, a convenient mechanism for moving the kayak from ground level to vehicle roof level; and, correspondingly, from the roof level back to the ground. Such a mechanism should be lightweight, easy to handle, easy to install. It is also convenient if the mechanism is easily foldable until it is needed.

From the above, it is therefore seen that there exists a need in the art to overcome the deficiencies and limitations described herein and above.

SUMMARY OF THE INVENTION

The shortcomings of the prior art are overcome and additional advantages are provided through a series of four connected support rods that are affixable to a basic roof rack. The device includes a first horizontal support which is affixable to both parts of a standard roof rack. A second horizontal support is also affixable to both parts of the roof rack; these first two supports lie substantially in a single plane. A third support is rotatably connected, substantially at a right angle to the first support. Typically the third support extends upwardly at an angle and toward one side of the vehicle. The third support also includes a hoist 121 at the other end for lifting the kayak. A fourth support connects the second horizontal support and the third support, the connection between the fourth support and the third support is slidable along the third support, with said fourth support being rotatably connected with the second horizontal support. The fourth support serves to hold the third support in an upwardly angled position with the end of the third support being disposed substantially above the side of the vehicle adjacent to the kayak on the ground to be loaded.

In an alternative embodiment of the present invention, the second support is affixed to the top of a cradle structure used to hold a kayak. These cradle structures are in common use. In fact, in various embodiments of the present invention the second support structure (rod/bar) is a fixable to any part of a vertical portion of the kayak cradle.

In yet another embodiment of the present invention, instead of being affixed to the roof rack itself, the second (horizontal) support is affixed to the vertical portion of a kayak cradle which is itself affixed to the roof rack structure by strap 207 seen in FIG. 5. Lengths of the supports in this embodiment are adjusted so that in its final configuration the portion referred to above is positioned substantially over the edge of the vehicle roof. This is particularly true of the third support.

Furthermore, in order to cut down on vibration due to wind conditions when driving, guy wires may be employed connecting the fourth support to the second support. The device of the present invention is affixed to the roof rack 201 by any convenient conventional means. This includes ropes, cords, clevis pin structures, nuts and bolts, screws and even an adhesive although this is not recommended. In preferred uses of the present invention the apparatus is affixed to the roof rack 201 by means of nylon strips together with any number of possible cinching devices.

Accordingly, it is an object of the present invention to provide a portable device for lifting a kayak to the roof of a car.

It is another object of the present invention to provide a device which assists physically limited individuals in the lifting of an object such as a kayak.

It is yet another object of the present invention to provide a device which is easily construct a ball and which is portable.

It is a still further object of the present invention to provide a lifting device which is lightweight and easy to attach to a standard roof rack.

It is still another object of the present invention to provide a kayak lifting device which is usable with a roof rack and kayak cradle to enable the lifting of the kayak into the cradle.

Lastly, but not limited hereto, it is an even further object of the present invention to provide a kayak lifting device which is easily manufactured and assembled on-site.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION

Figure 1:
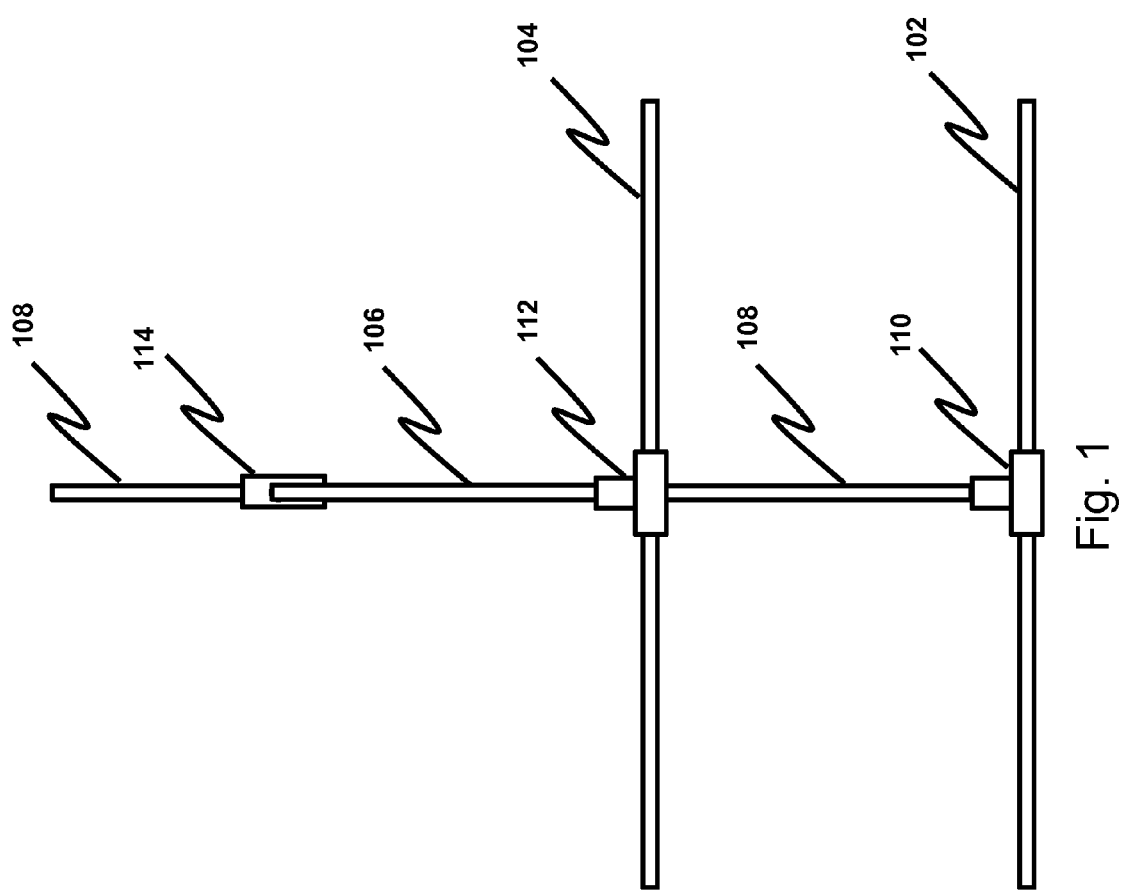
FIG. 1 is a front, elevation view illustrating the components of the invention.

FIG. 1 illustrates a view of the present invention as seen by an individual standing next to a kayak about to be loaded onto the vehicle. In particular, there is shown a first horizontal support 102 together with a T-shaped connector 110 into which the end of (third) support 108 is inserted. Connector 110 comprises a standard T-shaped pipe connector having a diameter and/or a cross-section into which supports 102 and 108 are inserted. Support 102 is intended to be easily slidable within connector 110. This is provided for ease of assembly and transport but is not an essential feature of the present invention. Support 108 is preferably pivotable in the sense that support 102 exists in the form of an axis of rotation. This rotatability is provided by connector 110. Similar features of rotatability and slidability are preferably provided by the other connectors shown in FIG. 1 namely connectors 112 and 114.

Support 108, in utilization, is intended to be angled upward from the roof of the car on a side thereof positioned distally from support 102 so that its end is positioned substantially over the edge of the roof nearest the boat which is intended to be lifted. Although not shown in FIG. 1, the distal end of support 108 has attached thereto a hoist which is described elsewhere herein. This hoist is visible in FIG. 9.

Support 108 is in turn connected to support 106 by means of connector 114. Support 106 is similarly connected to (second) support arm 104 by means of connector 112. Support 102 may be affixed to different structures depending upon the particular embodiment of the present invention. In the most general embodiment, support 102 is affixed to the roof rack by any convenient means but preferably by means of cinchable nylon straps. In embodiments of the present invention in which it is used in conjunction with a kayak cradle 202, support 104 is affixed to a vertical portion of cradle 202, typically at the top of the vertical cradle portion.

In preferred embodiments of the present invention the connectors are intended to have a circular cross-section for purposes of rotatability. However, in those embodiments of the present invention in which it is transported as a single unit, circular cross-sections are not required.

Figure 2:
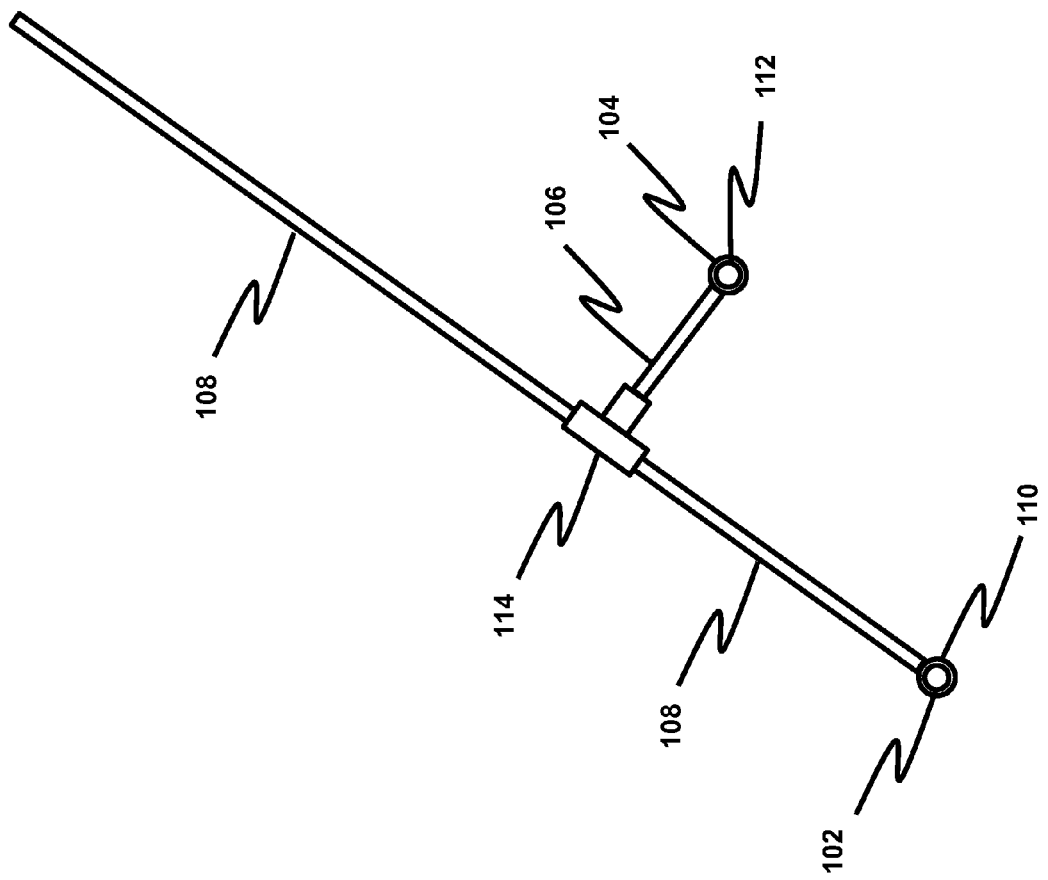
FIG. 2 is a side, elevation view illustrating the same structure as show in FIG. 1.

Attention is next directed to the structure illustrated in FIG. 2. The apparatus shown here is the same one as shown in FIG. 1. However, it is a view seen by an individual standing at the front or rear of the vehicle. This view is helpful in understanding the issues of rotatability and slidability. Again, it is noted that these features are important for providing portability, transportability and ease of assembly on-site. In the most general embodiment of the present invention, the subject apparatus forms a solid, more unitary structure wherein these features are not essential. FIG. 2 is also useful in understanding the role played by (fourth) support 106. The length of support 106 determines the angle that support 108 makes with support 102.

Figure 3:
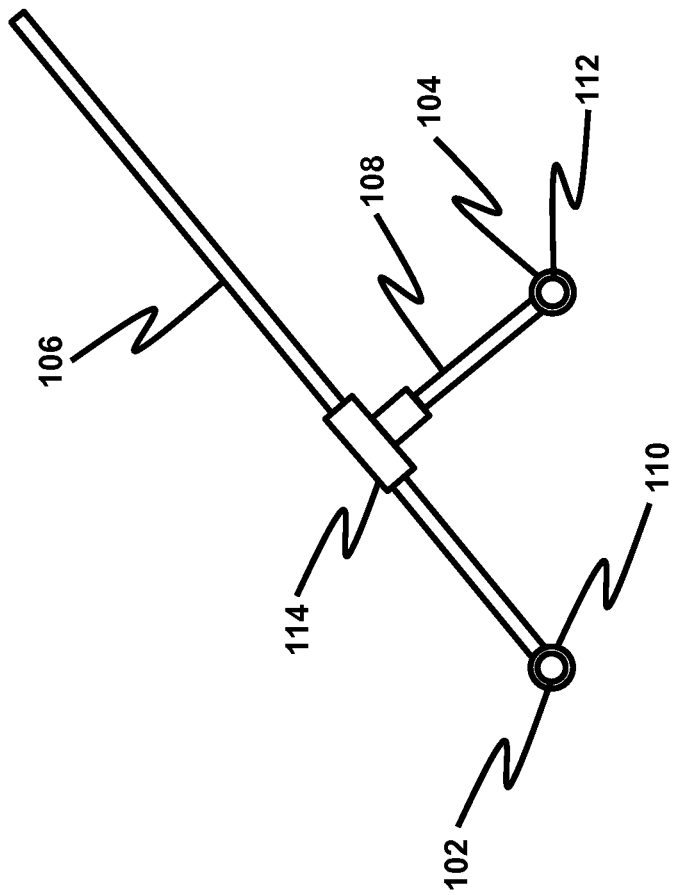
FIG. 3 is a side elevation view similar to FIG. 3 but more particularly illustrating an embodiment of the present invention that does not require a kayak cradle.

FIG. 3 is a view of the present invention similar to the one shown in FIG. 1 with the exception that supports 102 and 104 are substantially at the same height reflecting the fact that, in this embodiment, these supports are affixed directly to the roof rack instead of to the vertical portions of a kayak cradle.

Figure 4:
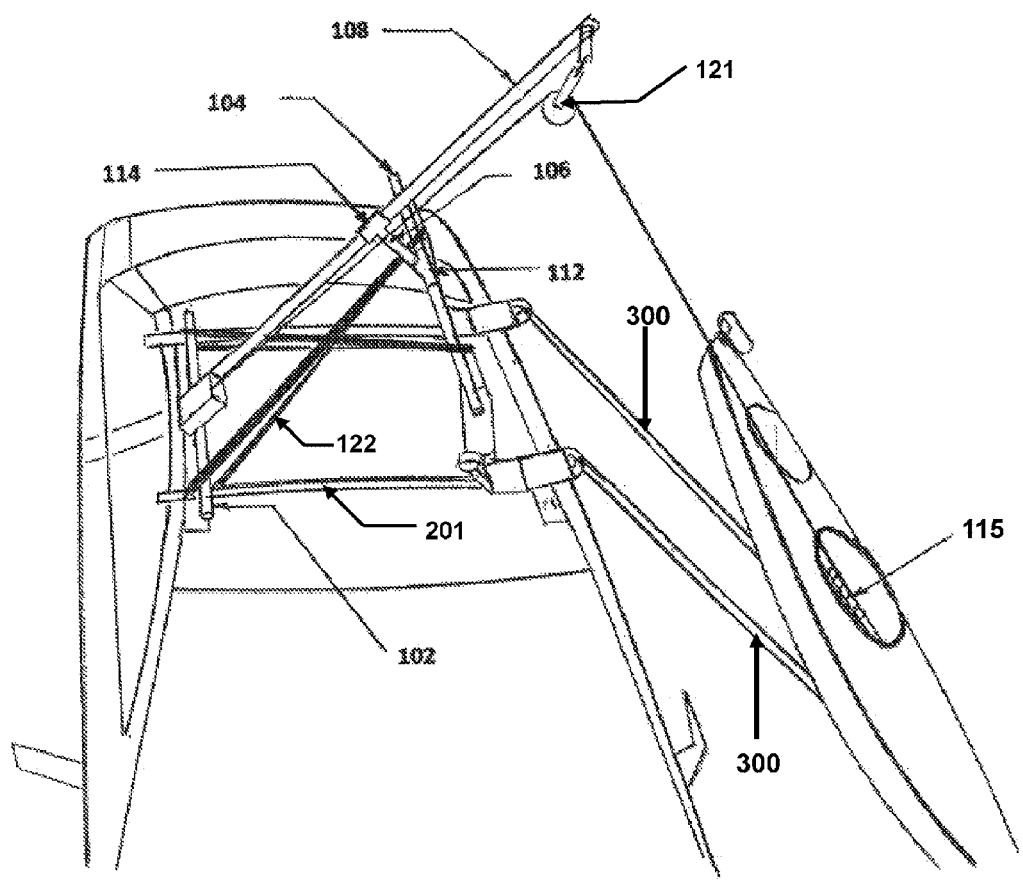
FIG. 4 is an overhead view illustrating an initial phase of the use of the present invention in loading a kayak on a vehicle.

FIG. 4 is an illustration of the use of the present invention in conjunction with what is probably best described as "ramp rods 300." As mentioned above, such devices are known in the art and provide somewhat of a mechanical advantage in terms of lifting a kayak to roof height. This view also illustrates the relationship between the present invention, a vehicle, it's standard roof rack, kayak cradles, "ramp rods" and a kayak.

Figure 5:
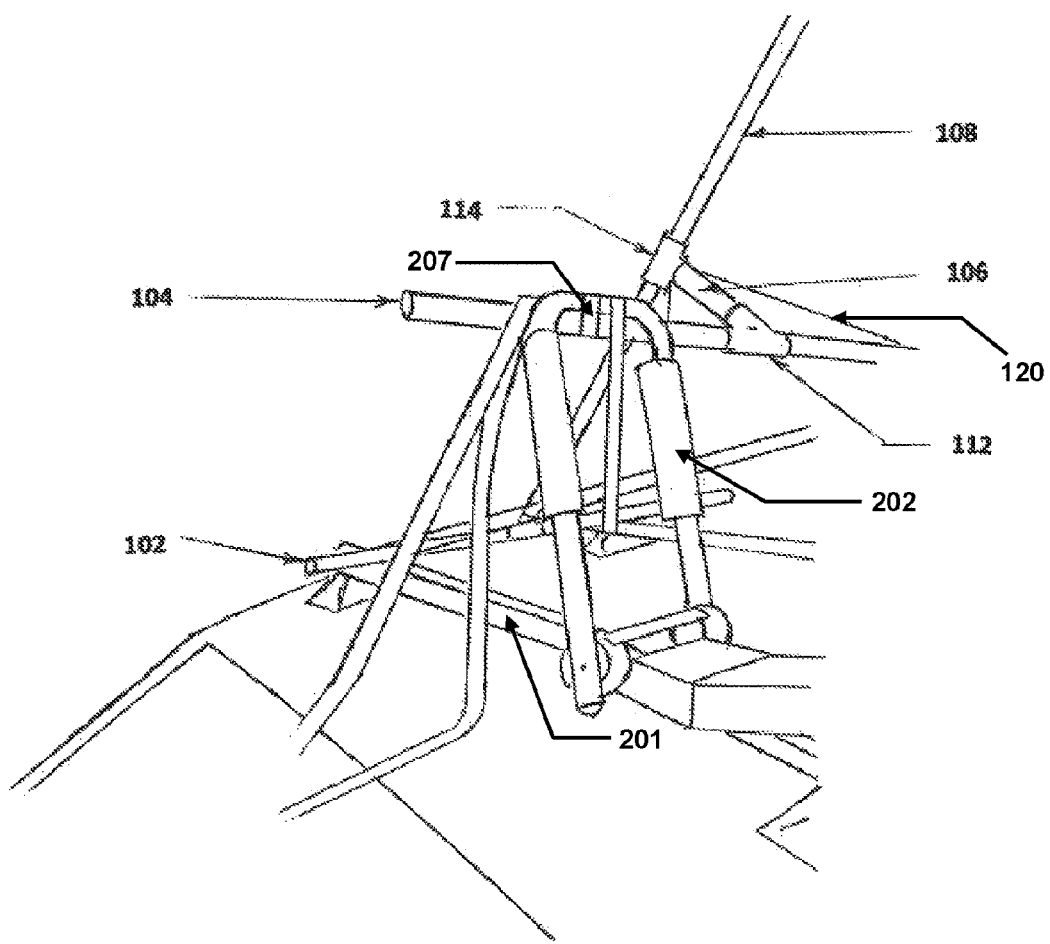
FIG. 5 is an angled, front view of the present invention installed on a vehicle.

FIG. 5 is a more detailed illustration of the utilization of kayak cradles. These cradles are shown being used in conjunction with the present invention. In particular, it is seen in this figure that supports 102, 104, 106 and 108 are specifically referred to.

Figure 6:
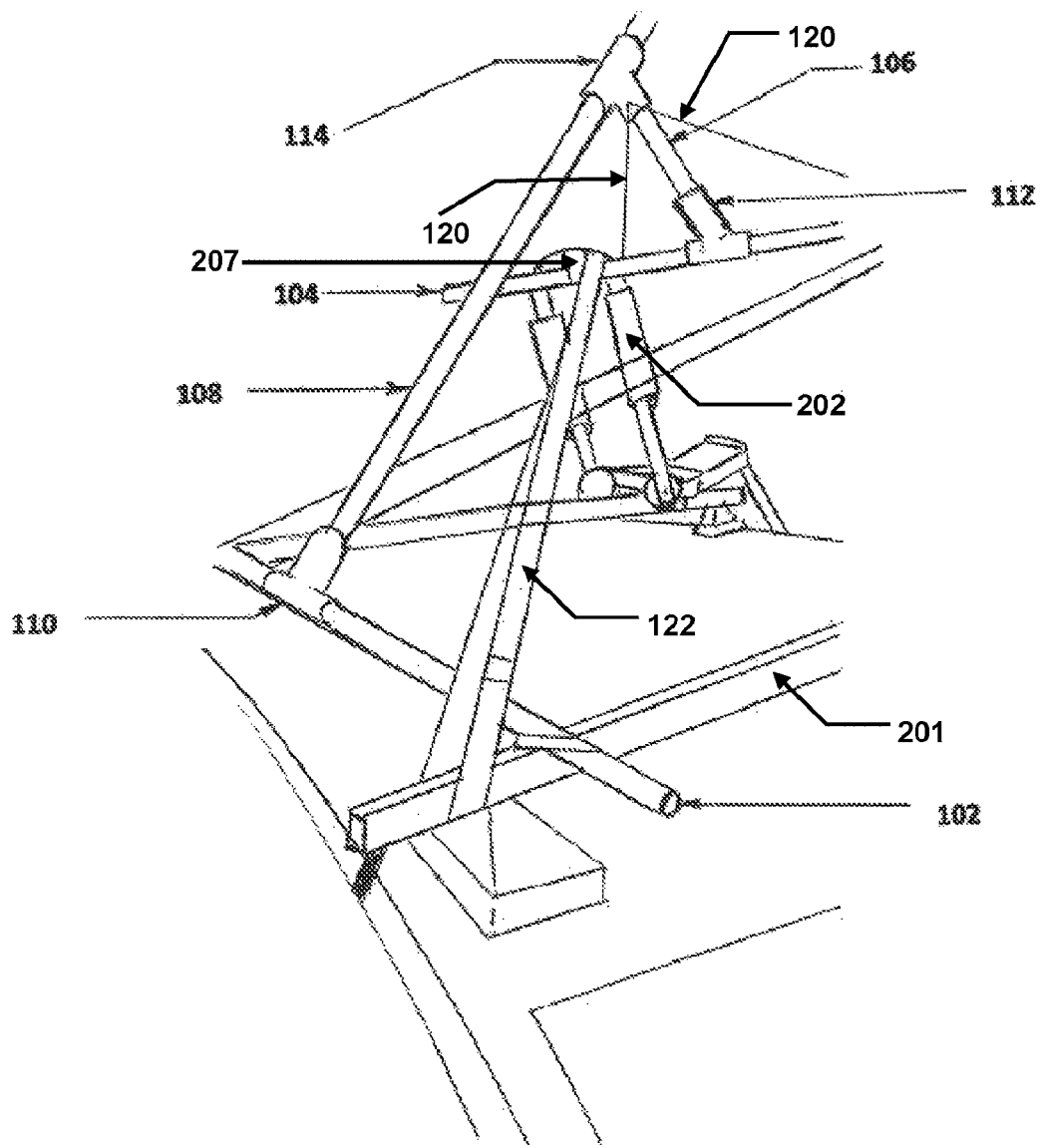
FIG. 6 is a view similar to FIG. 4 except shown from a rearward position.

FIG. 6 is particularly illustrative of the fact that nylon straps 122 may be employed connecting second horizontal support 104 and roof rack 201. As above, these are cinchable straps. They are employed to provide additional overall structural rigidity and to reduce vibration due to vehicular speed during transport. Also shown in FIG. 6 is the presence of guy wires 120 extending substantially from connector 114 two ends of support 104.

Figure 7:
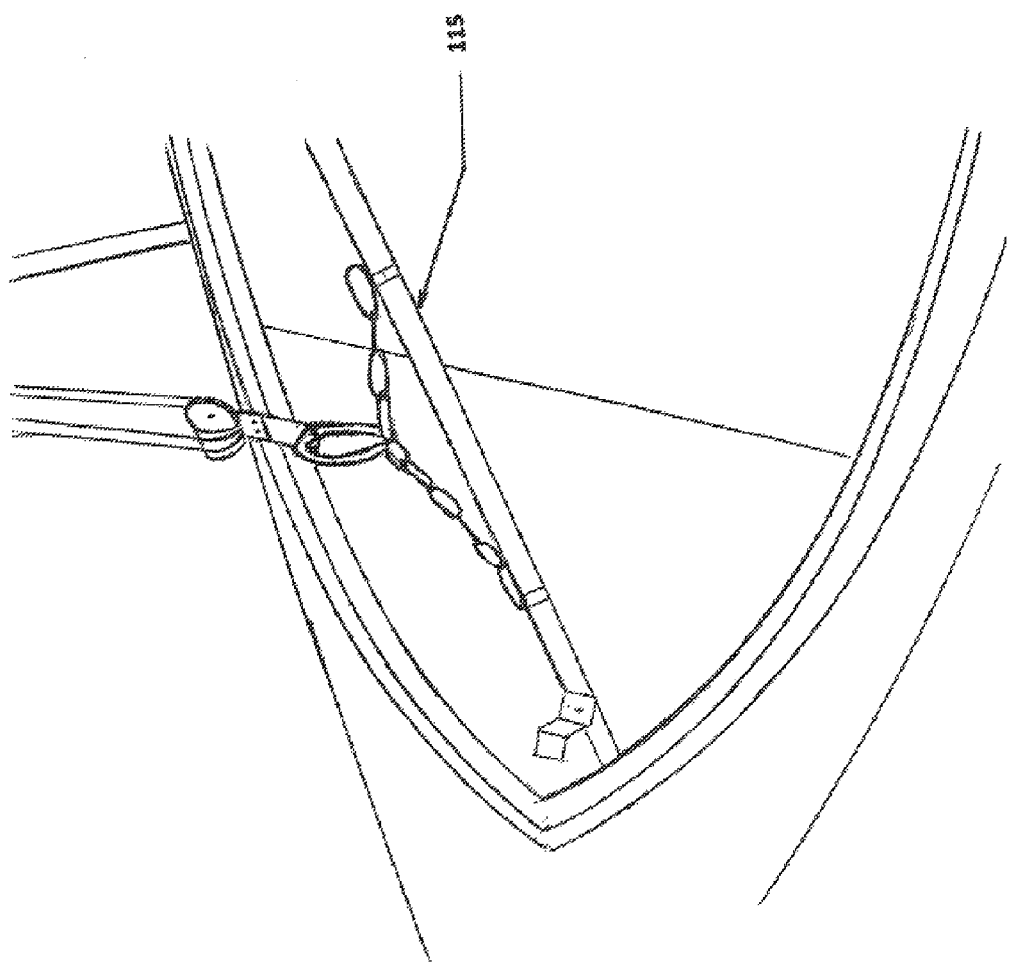
FIG. 7 is a view illustrating the use of a supplemental loading support rod which is placed within the kayak seat opening to facilitate lifting.

FIG. 7 is particularly important in that it illustrates a preferred mechanism for connecting the hoisting cable (wire, rope, cord, chain, etc.) to the kayak. A typical kayak possesses a cockpit opening into which horizontal bar 115 is placed. Clearly, bar 115 is selected to be longer than the opening of the kayak cockpit. A cable connects this bar to the hoisting mechanism and it is this bar which carries the weight of the kayak as it is lifted. Bar 115 comprises any convenient material.

Figure 8:
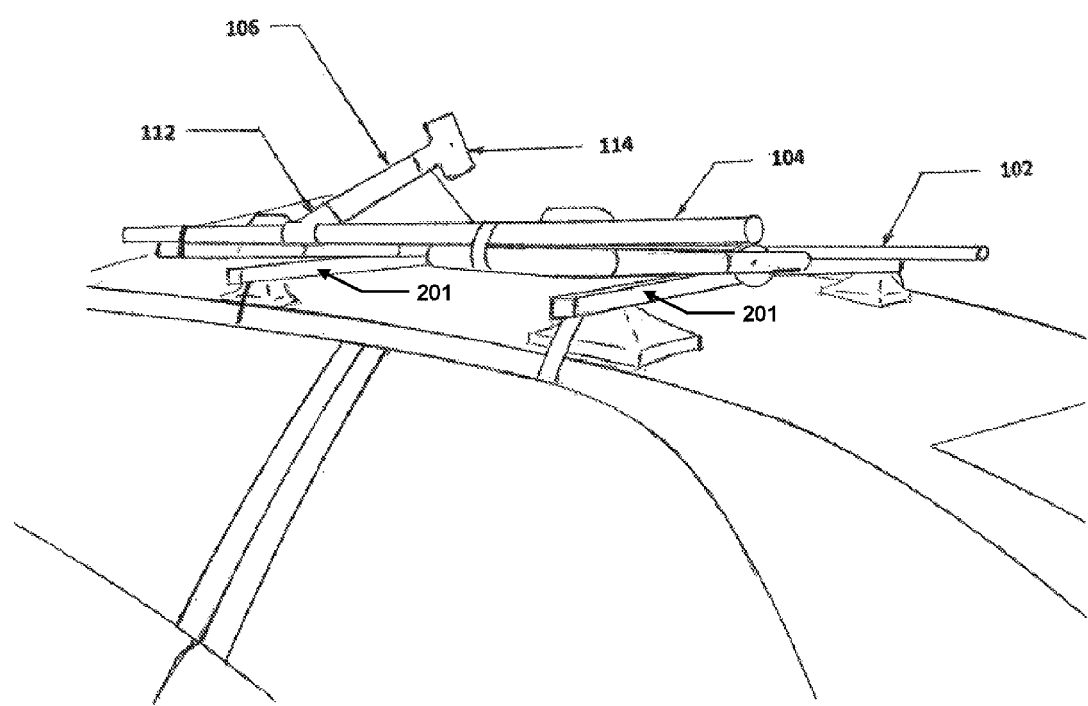
FIG. 8 is a view of the present invention shown in a collapsed or folded configuration.

FIG. 8 is relevant in that it illustrates the present invention in a folded configuration.

Figure 9:
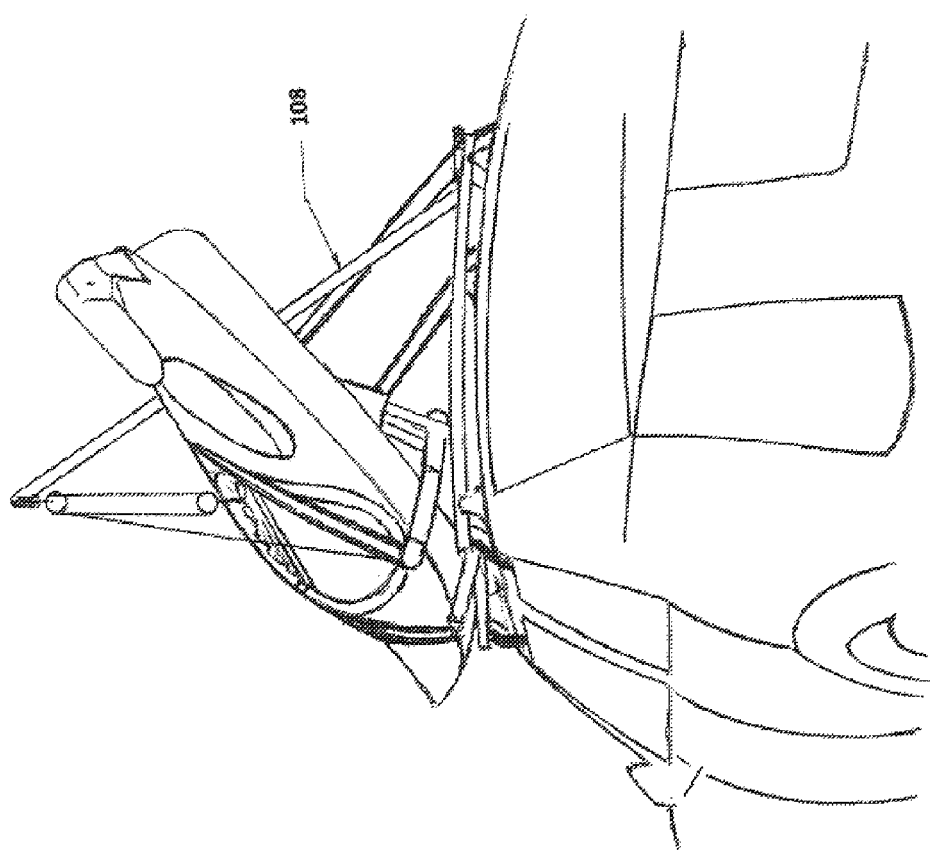
FIG. 9 is a view illustrating the final positioning of a kayak in a roof rack, as positioned by use of the present invention.

FIG. 9 is relevant in that it illustrates the presence of a kayak sitting in a cradle after has been lifted into place using the present invention.

The supports referred to in the present invention may comprise rods or bars having any desirable cross-section. In preferred embodiments of the present invention the supports referred to herein comprise lightweight aluminum tubes. They may be of any convenient length or diameter. Such tubes are lightweight and render fabrication easy. The couplings between support structures in the present invention preferably comprise T-shaped plastic piping comprising material such as PVC. These materials are lightweight easy to assemble and are not particularly sensitive to exposure to water. In the event that the kayak is a sea kayak intended for salt water use specially graded aluminum is preferably employed. While aluminum is preferred for the support structures of the present invention, it is also possible to employ wood, steel or plastic. The support structures do not have to each comprise the same material.

It is to be noted that, as used herein, the term "hoist" is intended to refer to any device having a mechanical lifting advantage. In typical embodiments of the present invention the hoist comprises a conventional arrangement of pulleys. In other embodiments of the present invention it is also possible to employ ratcheting devices such as "come-alongs." The present invention may also be fitted with a battery-powered winching device.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 USC §112, sixth paragraph, unless the element is expressly recited using the phrase "means for."

While the invention has been described in detail herein in accordance with certain preferred embodiments thereof, many modifications and changes therein may be effected by those skilled in the art. Accordingly, it is intended by the appended claims to cover all such modifications and changes as fall within the spirit and scope of the invention.

What is claimed is:

1. A device for loading a kayak onto a vehicle having a roof rack with at least two lateral supports extending across said vehicle from side window to side window of said vehicle and a pair of kayak cradles having vertically oriented supports extending upwardly from said lateral supports, said device comprising:

a first horizontal support affixable to both of said lateral roof rack supports;

a second horizontal support affixable to said vertical kayak cradle supports, said first and second supports lying substantially in a plane;

a third support, said third support being rotatably connected and substantially at a right angle, to said first horizontal support;

guy wires connecting said second horizontal support to said fourth support;

a fourth support connecting said second horizontal support and said third support, the connection between said fourth support and said third support being slidable along said third support and with said fourth support being rotatably connected with said second horizontal support; and a hoist, mounted on said third support, distally from said first horizontal support.

2. The device of claim 1 further including straps connecting said second horizontal support and said kayak cradle to said roof rack.

3. The device of claim 1 in which said supports comprise material selected from the group consisting of aluminum, steel, plastic and wood.

4. A device for loading a kayak onto a vehicle having a roof rack with at least two lateral supports extending across said vehicle from side window to side window of said vehicle, said device comprising:

a first horizontal support affixable to both of said lateral roof rack supports;

a second horizontal support also affixable to said lateral roof rack supports, said first and second supports lying substantially in a plane;

a third support, said third support being rotatably connected, substantially at a right angle, to said first horizontal support;

a fourth support connecting said second horizontal support and said third support, the connection between said fourth support and said third support being slidable along said third support and with said fourth support being rotatably connected with said second horizontal support;

guy wires connecting said second horizontal support to said fourth support; and a hoist mounted, on said third support, distally from said first horizontal support.

5. The device of claim 4 in which said supports comprise material selected from the group consisting of aluminum, steel, plastic and wood.

\* \* \* \* \*